Figure 1:
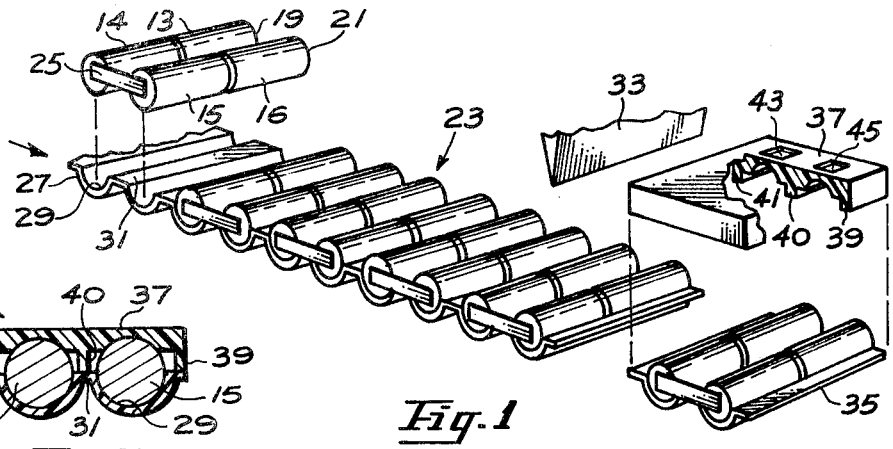
Figure 2:
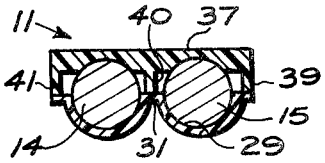
Figure 3:
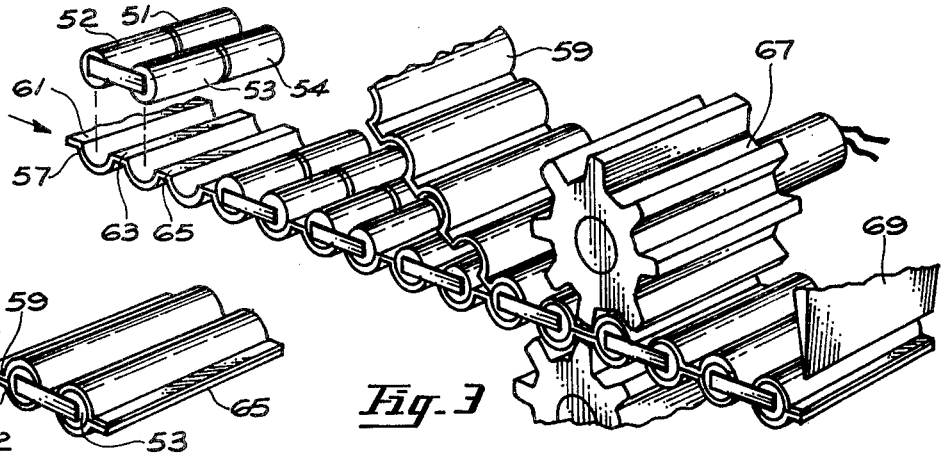
Figure 4:
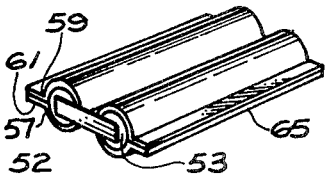
Figure 5:
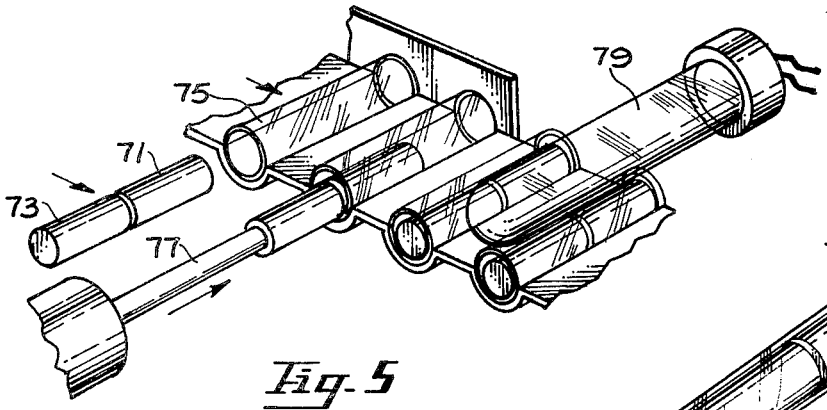
Figure 6:
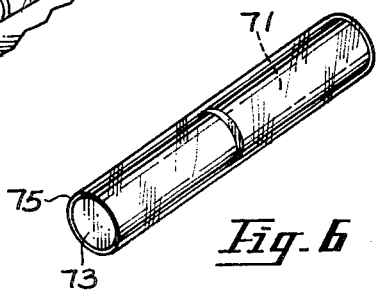

United States Defensive Publication [19] (H) [11] T986,011

Affolter et al. [43] Sep. 4, 1979

[54] BATTERY PACKAGE AND ASSEMBLY

[76] Inventors: Peter Affolter, 281 Manitou Beach Rd., Hilton, N.Y. 14468; Michael A. Matharani, 249 Pennels Dr., Rochester, N.Y. 14626

[21] Appl. No.: 14,670

[22] Filed: Feb. 23, 1979

[51] Int. Cl.[2] ..... H01M 2/10

[52] U.S. Cl. ..... 429/157; 429/159; 29/623.1

[57] ABSTRACT

A battery package includes a plurality of cylindrical cells electrically connected in series and wrapped in a plastic web. The web includes a plurality of adjacent, parallel arches or arcuate sections that conform generally to the cylindrical shape of the cells to constrain the cells in the package in a predetermined relationship. Although the web is somewhat flexible, it provides a generally rigid package when secured around the cells. In one embodiment, a single web engages the cells against a more solid structural piece to define a stable battery structure. In another embodiment the cells are encased in opposed plastic webs, each having a plurality of arches separated by intermediate sections. The opposed webs are then sealed together at the intermediate sections to capture the cells between the arches and to rigidify the overall battery structure. In still another embodiment, two cells, welded together end-to-end, are inserted into a tube of plastic shrink wrap. When the wrap is heated, it contracts around the cells, holding them together in a substantially rigid structure.

In at least the first-mentioned of the above embodiments, the web can be used to facilitate handling of a plurality of the multi-cell batteries during manufacture and storage. Individual batteries would then be cut from the web for use.

8 Claims, 1 Sheet Drawing,

9 Pages Specification

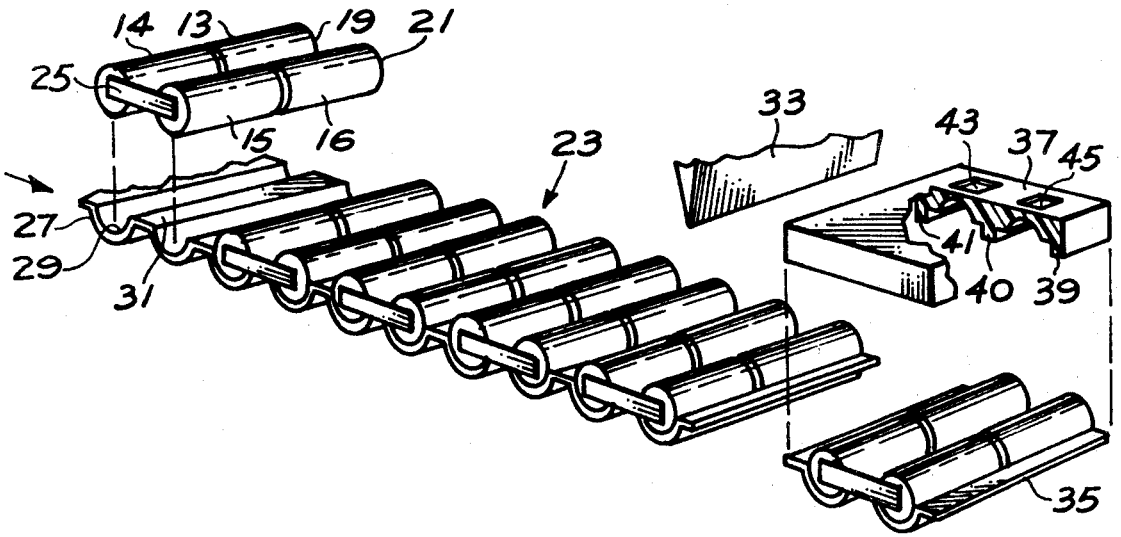

The file of this unexamined application may be inspected and copies thereof may be purchased (849 O.G. 1221, Apr. 9, 1968).